US007676581B2

(12) United States Patent
Isaacs

(10) Patent No.: US 7,676,581 B2
(45) Date of Patent: Mar. 9, 2010

(54) WEB APPLICATION RESOURCE MANAGEMENT

(75) Inventor: Scott M. Isaacs, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 895 days.

(21) Appl. No.: 11/218,150

(22) Filed: Sep. 1, 2005

(65) Prior Publication Data

US 2007/0050477 A1    Mar. 1, 2007

(51) Int. Cl.
*G06F 15/16* (2006.01)
*G06F 15/173* (2006.01)

(52) U.S. Cl. .................. 709/227; 709/219; 709/240
(58) Field of Classification Search ............. 709/217, 709/219, 230, 231, 235, 227, 229, 238–245
See application file for complete search history.

(56) References Cited

U.S. PATENT DOCUMENTS 4,645,874 A * 2/1987 Fildes .................. 379/93.01

| 5,826,031 | A | * | 10/1998 | Nielsen | 709/233 |
| 6,269,403 | B1 | * | 7/2001 | Anders | 709/231 |
| 2002/0029256 | A1 | * | 3/2002 | Zintel et al. | 709/218 |
| 2002/0073167 | A1 | * | 6/2002 | Powell et al. | 709/217 |
| 2003/0061256 | A1 | * | 3/2003 | Mathews et al. | 709/101 |
| 2004/0015777 | A1 | * | 1/2004 | Lei et al. | 715/500 |

* cited by examiner

*Primary Examiner*—Jeffrey Pwu
*Assistant Examiner*—Jeffrey Seto
(74) *Attorney, Agent, or Firm*—Vierra Magen Marcus & DeNiro LLP

(57) ABSTRACT

A resource manager for a network application, such as an application defined in a Web-browser, is provided. The manager requests resources, the resource type and a priority defined for the resource in the application. The manager is provided in a computer-readable medium having computer-executable instructions causing a computer to implement certain steps. These may include the steps of: interpreting resource requests from the Web browser based on resources required by a page; and issuing resource requests based on a user specified priority. The steps of interpreting and issuing may occur for all requests to a given domain.

15 Claims, 5 Drawing Sheets

WEB APPLICATION RESOURCE MANAGEMENT

BACKGROUND

The user experience on the World Wide Web has evolved from viewing static pages of information to more complete interaction with Web-based applications. Most users experience the Web through a Web Browser application such as Internet Explorer, Opera, Netscape or Firefox. Web browsers provide an essentially forms based environment to the developer. Techniques for manipulating browsers, originally designed to display text and presentation information, have included the provision of richer tools and HTML enhancements, including a client side scripting environment-JavaScript-Cascading Style Sheets (CSS), and Macromedia Flash.

Web-applications are downloaded via potentially constrained connections to a server. As these applications get more interactive, the size of code and data can grow immensely. There is typically a conflict between providing enriched client interactivity in a Web document while maintaining client performance. As pages increase in interactivity, their size increases, and download speed often decreases. Therefore, a goal of the developers is to remove bottlenecks often associated with adding behaviors. Perceived performance is tightly correlated to rendering speed or how fast the first screen of content is displayed.

Currently, most Web applications request page elements by opening at most two persistent connections between the browser and the server in accordance with The Internet Engineering Task Force RFC 2616-Hypertext Transfer Protocol—HTTP/1.1. While it is possible to modify this parameter in many browsers to increase access to resources, most browser manufactures adhere to the recommendations of RFC 2616. In addition, when Web-pages consisting of many external resources such as images, style sheets, scripts, and xml files, is loaded by the browser and the resources requested from a server, there is generally no defined ordering to the retrieval of such resources. However, in a Web page, some resources, such as images, are often secondary to the overall experience and should not block important operations such as executing a delete item or send mail command.

SUMMARY

Resource management in a network application, such as an application defined in a Web-browser, is provided by a resource manager based on the type and a priority defined for the resource in application. The manager creates a resource priority stack which allows a developer to manage limited network connections using resource priority and other considerations.

In one embodiment, a computer-readable medium having computer-executable instructions causing a computer to implement certain steps is provided. These may include the steps of: interpreting resource requests from the Web browser based on resources required by a page; and issuing resource requests based on a user specified priority. The steps of interpreting and issuing may occur for all requests to a given domain.

Alternatively, a method of providing a Web-based application is provided. The method includes a step of providing a resource manager interpretable by a Web-browser to a browser on a client. In addition, the method includes responding to requests from a Web-Browser for resources required by a Web-page responsive to the resource manager based on at least a resource priority definition stored in a Web-page.

Still further, a method of creating a Web page rendered on a computer is provided. The method may include defining a call to a resource manager executable by a Web browser, and defining at least one resource link including a resource identifier and a resource priority, the resource link interpretable by the resource manager.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A network service provides prioritized resource management for Web-based applications. Resources required by the application can be prioritized, and put or get requests implemented in prioritized order. The service creates a resource priority stack which allows a developer to manage the limited connections between a browser and a server (or domain) by ensuring high-priority requests occur before lower-priority requests.

Figure 1:
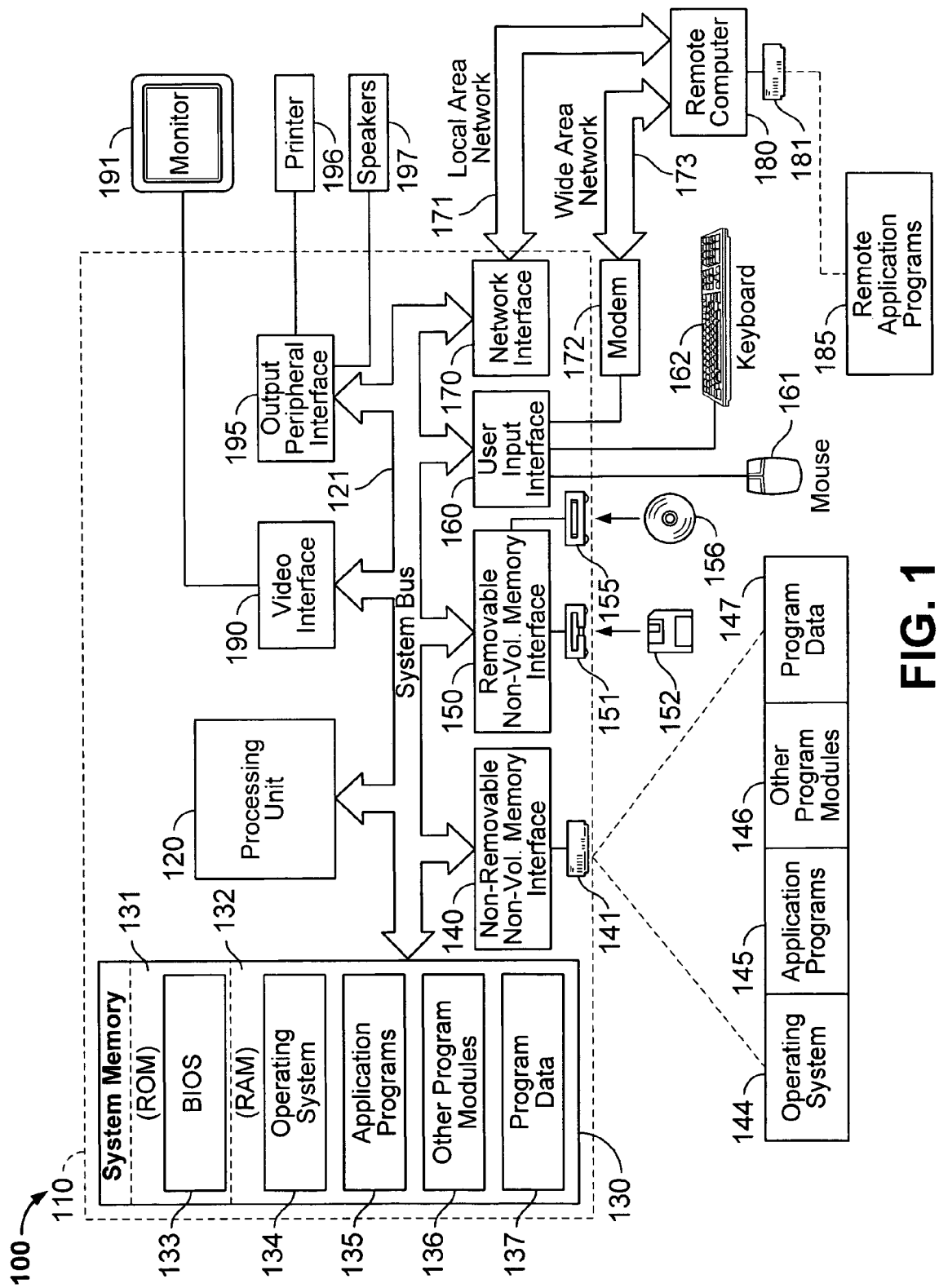
FIG. 1 depicts a processing device suitable for implementing any of the processing devices in accordance with the present disclosure.

In one embodiment, the service is operable on a general purpose computing device which operates as a server or a client. With reference to FIG. 1, an exemplary system for implementing the method and manager described herein includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
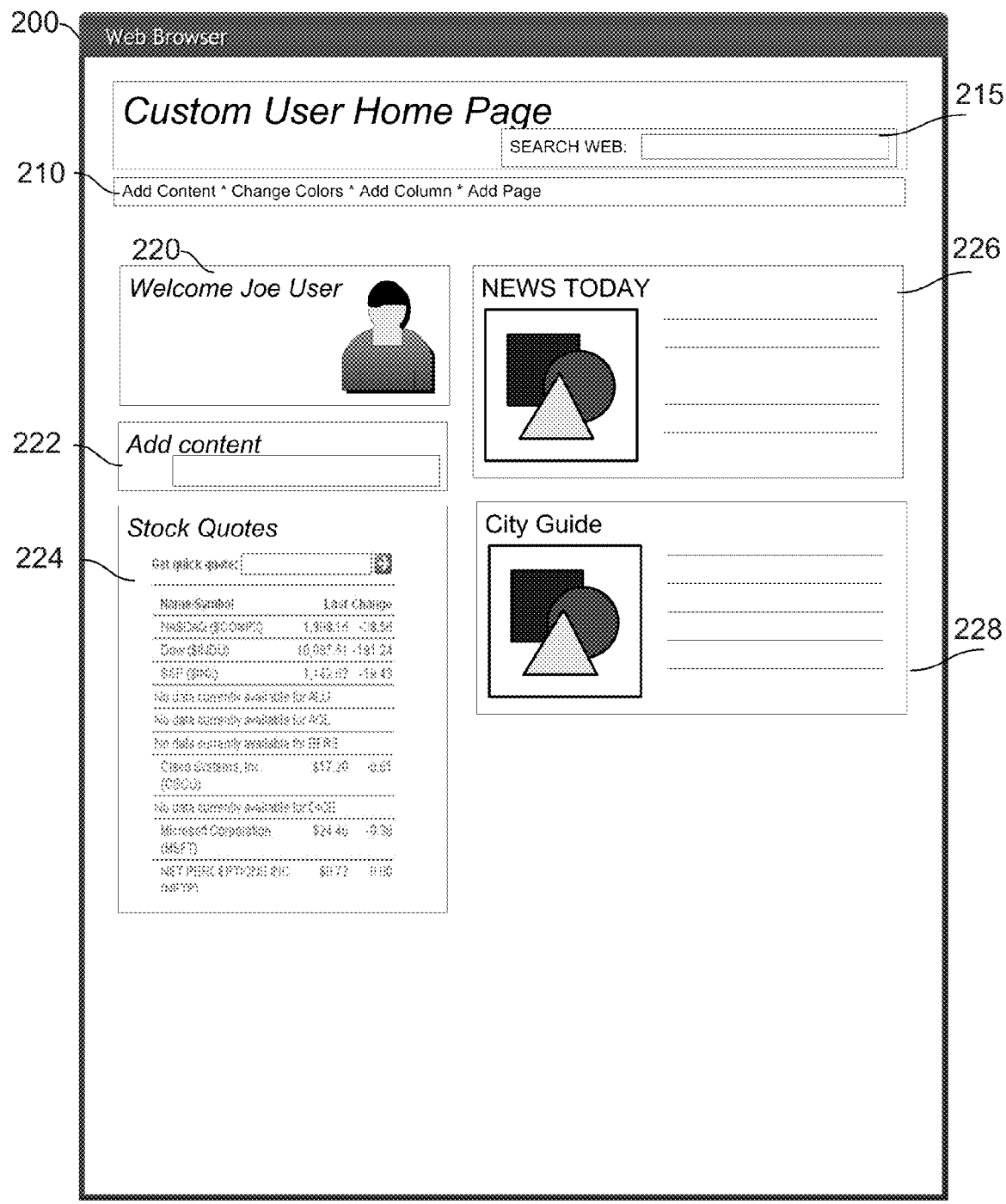
FIG. 2 depicts a multi-component Web page.

FIG. 2 illustrates a Web page 200 rendered in a browser and having multiple components. The components may include a menu 210, search box 215 and content modules 220, 222, 224, 226, and 228. Each module contains content and presentation information, and may further include effects and customizable options such as a stock list. Each section of the page 200 may be enabled by content and presentation information embedded in the BODY of the page, or scripts embedded in the page. As should be readily understood, each module could comprise an application (such as a text editor, spell checker or other Web-based application).

As discussed below, the resources (images, content, scripts, etc.) required by the page are managed for download by the network service, allowing developers to control how resources are requested and used. As an example, suppose one of the modules on page 200 is an email composition window including a "send mail" button which, when selected by the user, operates a post command in the browser to transmit mail from the module to the server to transmit an email message. A page developer may specify that the send mail command take a higher priority than all other resources vying for interaction with the application server. This command may then take priority over an image download or page refresh.

Figure 3:
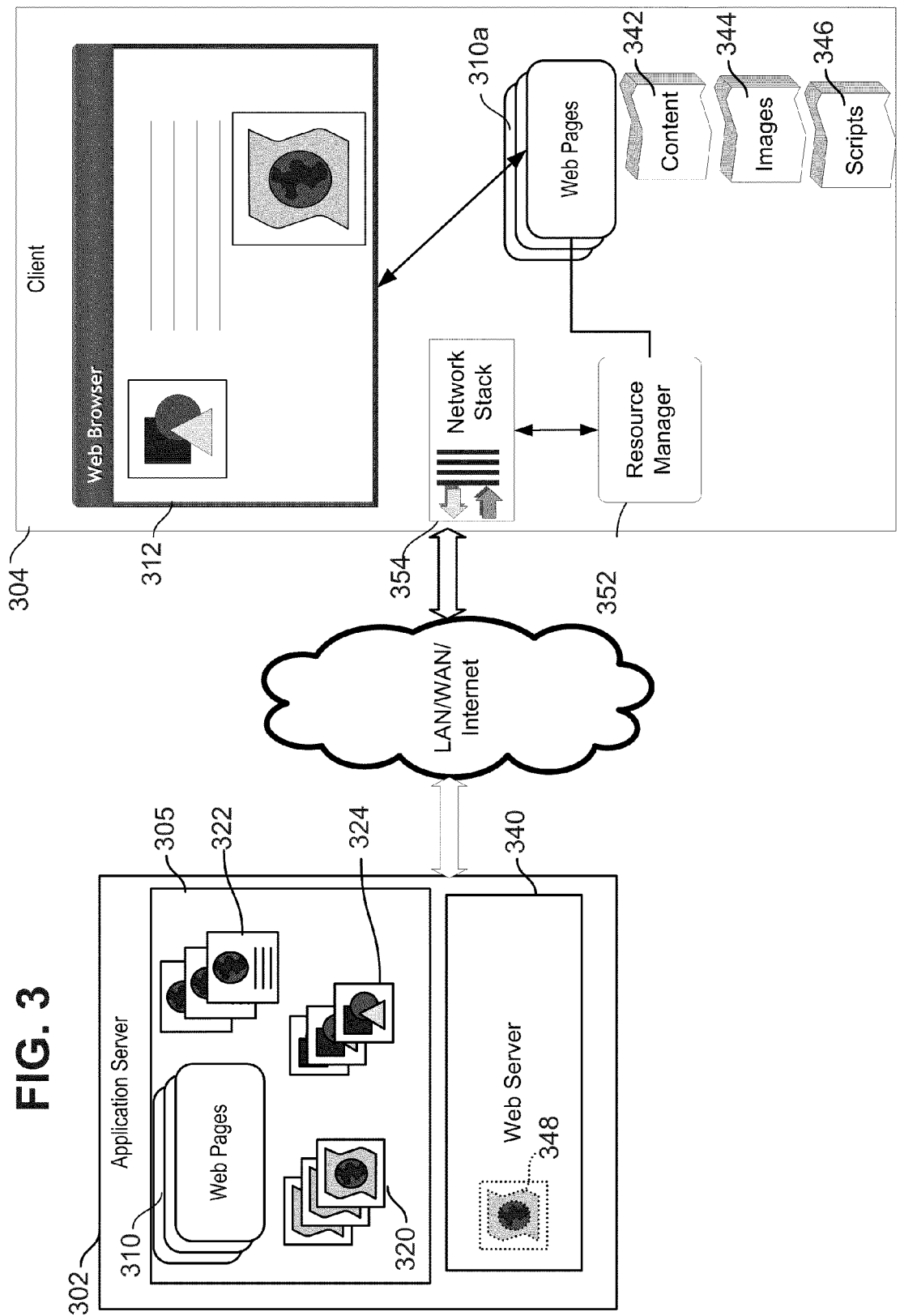
FIG. 3 depicts a server processing device and a client device suitable for implementing the framework.

FIG. 3 is a block diagram illustrating an exemplary environment for implementing the network manager including an application server 302 and a client processing device 304. Both the application server and the client processing device can be implemented by a processing device in accordance with FIG. 1. The application server and processing device may be coupled by a network connection including a local area connection, wide area connection, or a combination thereof such as the Internet. The application server 302 includes a Web server process 340 responding to requests from a browser application 312 on the client processing device. The application server 302 also includes a plurality of Web pages 310 which may be provided to the client device by the Web server 348, and resources such as scripts 320, style sheets 322, and images 324 used in the pages 310.

The client device 304 includes, for example, a Web browsing application 312 which may interpret resources required by the page and interpreted by the browser. Also illustrated as present in the device are downloaded pages 310a, content 342, images 344 and scripts 346 used by the browser in rendering the pages in browser 312.

In one embodiment, a resource manager 352 is provided on the client device and manages the deployment of page resources. The resource manager can download resources asynchronously and in parallel leading to better Web page performance. Multiple requests for resources can be shared, thereby increasing the overall actual and perceived performance to the user. The more the user visits the application server, the faster the network runs as there is a continually increasing probability that prerequisite files are cached.

As will be readily understood, the Web server 348 responds to requests from a browser 312, operating on the client device 304. The resource manager 352 may be included in the browser application or delivered to the client device 304 by the Web server 348. The resource manager may be implemented by one or more script files, such as JavaScript files, which can be interpreted by the browser 312. Any number of script files can be used, one or more of which provides core functionality describe herein and one or more of which provides compatibility for various different browser applications.

When provided as a script file, the resource manager can be invoked by a standard <script> command embedded in a Web page. Use of the script command in the page will cause the script to be downloaded in instances where the manager has not been previously downloaded, or reused from the client memory if the script is invoked and already downloaded for the browser session.

In general, the resource manager operates by creating a network stack 354 queuing and controlling requests within the browser application by type and priority. The network stack 354 provides a prescribed approach for managing a Web application's server requests. The network stack allows every request to have an associated priority. If a high-priority request is added to the stack, on the first available opportunity, that request will be executed (and all lower priority requests will follow).

Figure 4:
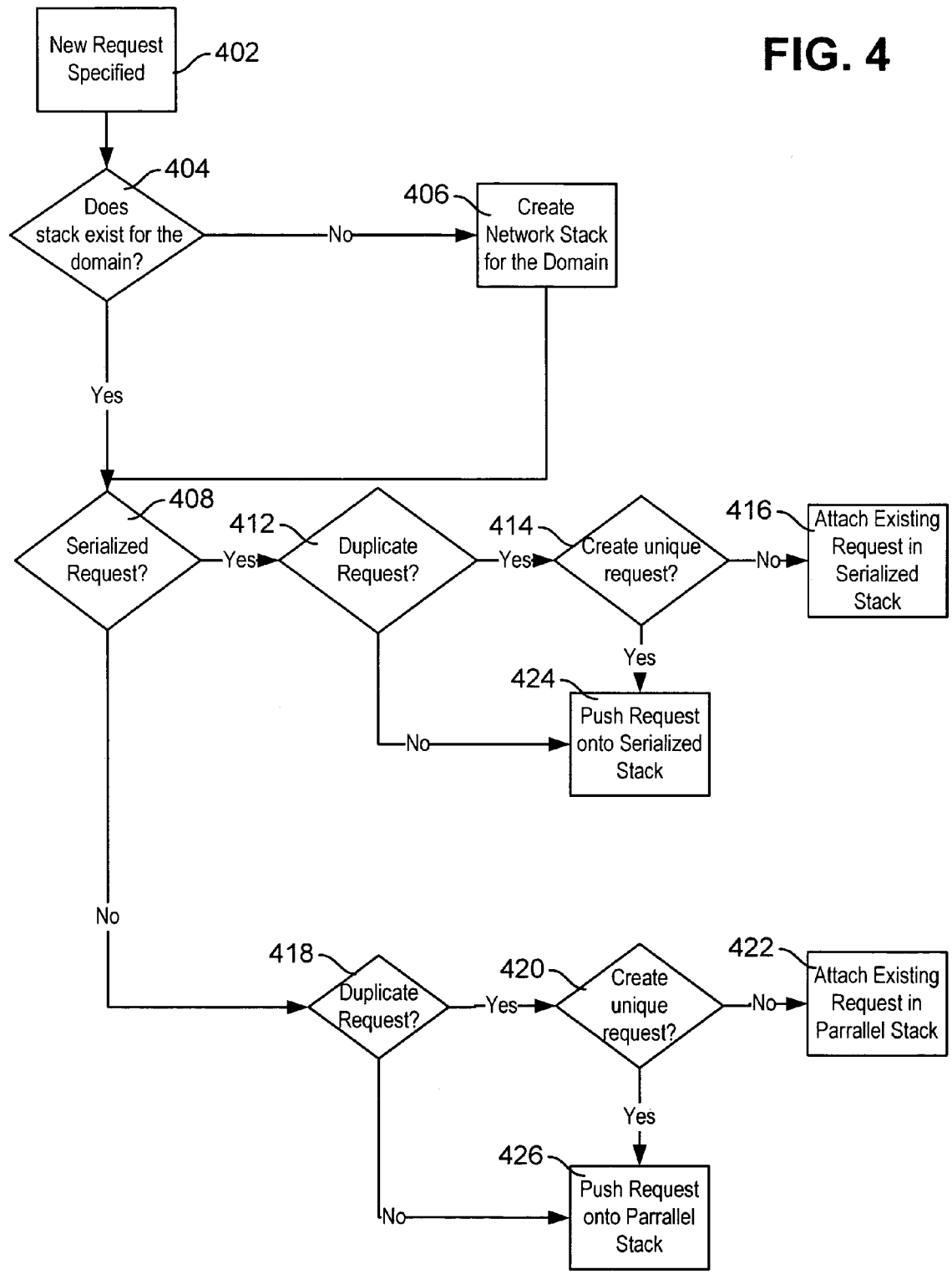
FIG. 4 depicts the request process executed by a resource manager disclosed herein.

FIG. 4 shows the general operation adding requests to the network stack. At step 402, a new resource is requested. As will be generally understood, each resource for a page is identified by a uniform resource locator (URL) specifying a unique location on the application server. In one embodiment, the network stack supports XMLPost, XMLGet, image requests, style sheet requests and script requests. To establish a request, a page developer calls a network object which includes a type argument, and a URL for the resource. The developer may optionally specify a context argument, a call back function, a priority argument, a post argument string, a header array and flags indicating whether the request is a serialized request or a duplicate request.

The type argument specifies the type of resource being requested. Types may include XML Get, XML Post, Script, Image and CSS. The URL argument specifies the URL of the resource requested. A context argument creates an object of any of the above types which passes a callback after the resource is retrieved. This is useful for passing state through the request. A callback function may be specified which is called after the resource is retrieved. If null is specified, the resource will be downloaded but no notification will be provided when this occurs.

A priority argument may be specified to identify the importance of the request relative to other requests. If no priority is specified, a default priority may be assigned by type. For example, images may default to low, scripts default to high, and all other resources default to medium. In one embodiment, a "high", "medium", or "low" priority may be specified. Additional levels of priority may be utilized in alternative embodiments of the manager.

A post string argument may be specified for XML requests. A header array object may provide an associative array of headers to be specified for resources of type XMLPost or XMLGet.

Flags in a request (of any type) specify whether the request is a serialized, parallel, and/or a unique request. A timeout argument may be specified to specify the longest duration a request should execute before considered timing out. Typically one can rely on the browser to timeout a request and that will be handled appropriately.

Returning to FIG. 4, initially, at step 404, a determination will be made as to whether a network stack exists for the domain. If no stack exists for the domain, one is created at step 406. Stacks are created on a per-domain basis. It should be understood that a domain may comprise one or more application servers addressable through a common reference, such as a domain name or IP address.

Once the stack is created, a determination is made at step 408 as to whether the request 402 is a serialized or parallel request. The resource manager supports two types of requests—serial and parallel. Parallel requests take advantage of the ability of the browser to maintain two concurrent connections with the domain by using the connections simultaneously. One advantage of this feature is that parallel requests can download scripts simultaneously. Normally, a script call in a Web page locks browser actions while downloading the script. The browser remains locked until the entire script is downloaded. The resource manager removes this bottleneck and allows scripts to be downloaded in parallel. Serialized requests allow the page designer to request resources in a specific order. Only one serialized request will occur at a time while parallel requests may be running simultaneously. When there are items in the serialized stack and no serialized requests are executing, the serialized request is guaranteed the next open slot, i.e. a serialized request takes precedence over the parallel stack.

In one embodiment, all requests may run parallel by default. In this embodiment, a developer must force a request to be serialized.

If the request is a serialized request, then at step 412, the manager will determine whether the request is a duplicate request. The resource manager can recognize duplicate requests for the same resource from the same browser session, and manage the requests to prevent downloading the same resource twice. In one embodiment, by default, any requests that completely match an existing request (including any callback) will not be executed. If a new request matches an existing request but has a different callback, only make a single request is made by the resource manager and multiple callbacks are handled when the item is returned. If multiple requests are present to the same domain, the resource manager recognizes that all five are going to the same URL with the same arguments, and lets the highest one exist, then fans out the call back to all requests.

If the request is not a duplicate request, at step 424 a new request is pushed onto the serialized stack. If the request is a duplicate request, then at step 414, a determination is made as to whether a unique request has been specified. If the request is a unique request, then at step 424 the unique, serialized request is pushed onto the serialized stack. If it is not specified as a unique request, then it is attached to an existing serialized request in the serialized stack at 416

Returning to step 408, if the request is not a serialized request, then at step 418 a determination is made as to whether a unique request has been specified. If the request is a unique request, then the unique request is pushed onto the parallel stack at step 426. If it is not specified as a unique request, then it is attached to an existing serialized request in the parallel stack at 422.

In a further aspect, the resource manager allows developers to group a batch of requests together. In such embodiment, a group argument allows independent requests to be grouped into a batch. An abort function is provided to allow individual requests in a batch of grouped requests to be aborted, whether executing or pending. This is useful when, for example, one wishes to simulate a traditional Web-page navigation model where navigating away from the page preempts requests. One can use this to support similar functionality within a Webpage to provide increased performance. For example, where a user switches views in the middle of a page or component loading, one can stop grouped requests for the prior view. An "abort all" function is also provided for group requests.

Additionally, multiple requests may be treated as a unit. This allows you to specify a single callback to occur as the result of the downloading of one to many resources. For example, if you require two scripts, a stylesheet, and an image before you can continue, you can specify a callback to occur when all those resources are available.

Figure 5:
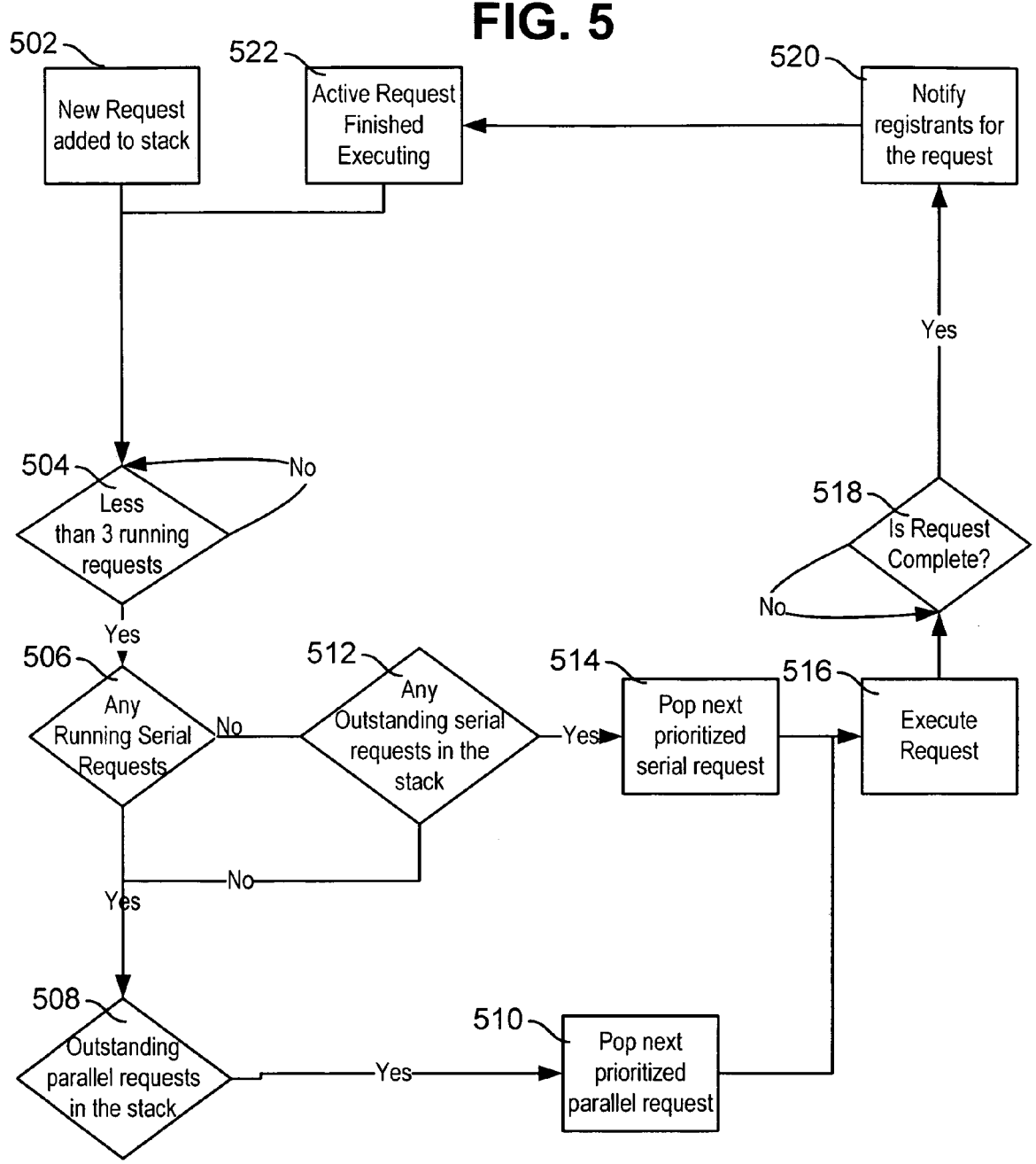
FIG. 5 depicts an execution process operated for a given domain in accordance with the present disclosure.

FIG. 5 is a flowchart illustrating the execution of requests in the network stack in one embodiment of the resource manager.

At step 502, a new request is added to the stack and queued until less than three running requests are present on the stack as indicated at step 504. Once less than three running requests are present, then at step 506, a determination is made as to whether there are any serial requests currently running. If there are no serial requests running, a determination is made as to whether there are outstanding serial requests in the stack at step 512. If so, then at step 514, the next serialized request is popped from the stack and executed at step 516.

If there are running serial requests at 506, or if there are no running serial requests (506) and no outstanding serial requests in the stack at 512, then at step 508 a determination is made as to whether there are any outstanding parallel requests in the stack. (Since the request 502 was added to the stack, and the request must be a serial or parallel request, the output of step 512 or 508 must be yes). At step 510, the next parallel request is popped from the stack and executed at step 516.

At step 518, a determination is made as to whether the request is completed and when completed, a notification is generated at 520. Step 522 decrements the count of running requests relative to the running requests determination at step 504.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. Non-transitory computer storage media storing computer-executable instructions causing a computer to implement the steps of:
   (a) receiving serial and parallel resource requests from a Web browser maintaining at least two connections with a server associated with a Web page, wherein each serial and parallel resource request identifies an instance of content included in the Web page and is associated with a priority;
   (b) generating a resource priority stack for managing the serial and parallel resource requests received in step (a);
   (c) determining whether each resource request received in step (a) comprises a serial resource request or a parallel resource request;
   (d) pushing each serial and parallel resource request onto the resource priority stack in order of priority based on step (c) of determining whether each resource request comprises a serial resource request or a parallel resource request;
   (e) determining if any serial resource requests are being executed by the application server associated with the Web page;
   (f) when a connection between the Web browser and the server becomes available,
     (i) issuing a serial resource request from the resource priority stack to the server associated with the Web page, if there is at least one serial resource request in the resource priority stack and there are no serial resource requests being executed by the application server associated with the Web page; and
     (ii) issuing a parallel resource request from the resource priority stack to the server associated with the Web page, if there is a parallel resource request in the resource priority stack and a serial resource request is being executed by the server associated with the Web page.

2. The computer storage media of claim 1, wherein said step of receiving includes receiving at least two requests grouped into a batch.

3. The computer storage media of claim 2, wherein each request in the batch is removed from the resource priority stack and each resource being executed is stopped in response to an abort function.

4. The computer storage media of claim 1, wherein said step of issuing a parallel resource request includes the step of issuing at least a first and a second parallel resource request to the application server.

5. The computer storage media of claim 1, wherein said step of issuing comprises the step of issuing a serial resource request prior to issuing any parallel resource request.

6. The computer storage media of claim 1, further including the step of notifying a process that a request has been issued.

7. The computer storage media of claim 1, wherein said step of receiving further includes determining whether duplicate serial resource requests have been received and the step of issuing a serial resource request further comprises issuing only one of said duplicate serial resource requests.

8. The computer storage media of claim 1, wherein a resource request includes an object that includes a type argument comprising XMLPost, XMLGet, image requests, style sheet requests or script requests.

9. The computer storage media of claim 1, wherein the priority associated with each serial resource request and each parallel resource request is assigned by the designer of the web page.

10. The computer storage media of claim 1, wherein the step (f)(i) of issuing a serial resource request comprises:
issuing the next highest priority serial resource request from the resource priority stack.

11. A method of providing a Web-based application, comprising:
providing a resource manager on a client, the resource manager interpretable by a Web-browser;
receiving requests from the Web-Browser for resources required by a Web-page being downloaded by the Web-browser, each request containing a flag indicating whether the request is a serial request or a parallel request;
determining a priority associated with each request, wherein the priority associated with the request is assigned by the web-page developer;
pushing the requests received from the Web-browser onto a network stack generated by the resource manager for an application server associated with the Web page, wherein the requests are pushed onto the network stack in order of priority;
providing at least two connections between the Web-browser and the application server;
if at least one of the connections is available, issuing a serial request from the network stack and executing the serial request using at least one of the connections if there is a serial request in the stack and no other serial requests are being executed; and
if no serial requests are located in the network stack or a serial request is being executed, issuing a parallel request from the network stack and executing the parallel request using both of the connections simultaneously when available.

12. The method of claim 11, further comprising the step of:
generating a notification when a request has been executed.

13. The method of claim 11, wherein said step of issuing includes issuing a request including one of an XMLPost request, XMLGet request, an image request, style sheet requests or a script request.

14. The method of claim 11, wherein the step of determining a priority comprises:
assigning a default priority to a request if a priority was not assigned to the request by the web-page developer.

15. The method of claim 11, wherein the step of pushing the requests received from the Web-browser onto a network stack comprises:
determining if any of the serial requests request the same resource; and
if more than one serial request requests the same resource, pushing only the highest priority serial request onto the network stack.

* * * * *